(12) United States Patent
Evans et al.

(10) Patent No.: US 11,341,761 B2
(45) Date of Patent: May 24, 2022

(54) REVEALING CONTENT REUSE USING FINE ANALYSIS

(71) Applicant: Microsoft Technology Licensing, LLC, Redmond, WA (US)

(72) Inventors: Nathan Roy Evans, Bremerton, WA (US); Christopher Miles White, Seattle, WA (US); Jonathan Karl Larson, Bremerton, WA (US); Darren Keith Edge, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 16/460,967

(22) Filed: Jul. 2, 2019

(65) Prior Publication Data

US 2021/0004582 A1   Jan. 7, 2021

(51) Int. Cl.
| | |
|---|---|
| *G06F 16/906* | (2019.01) |
| *G06F 16/901* | (2019.01) |
| *G06V 30/416* | (2022.01) |
| *G06V 30/414* | (2022.01) |
| *G06F 40/216* | (2020.01) |

(52) U.S. Cl.
CPC .......... *G06V 30/414* (2022.01); *G06F 16/906* (2019.01); *G06F 16/9014* (2019.01); *G06F 16/9024* (2019.01); *G06F 40/216* (2020.01); *G06V 30/416* (2022.01)

(58) Field of Classification Search
CPC ............ G06K 9/00463; G06K 9/00469; G06F 16/906; G06F 16/9014; G06F 16/9024; G06F 40/216

USPC .......................................................... 707/722
See application file for complete search history.

(56) References Cited

U.S. PATENT DOCUMENTS

| | | | |
|---|---|---|---|
| 8,108,393 B2 | 1/2012 | Yang et al. | |
| 10,013,488 B1* | 7/2018 | Zhao | .................... G06F 16/7335 |
| 10,430,693 B1* | 10/2019 | Tung | ........................ G06N 5/04 |
| 2004/0153445 A1 | 8/2004 | Horvitz et al. | |
| 2005/0222901 A1 | 10/2005 | Agarwal et al. | |
| 2008/0205776 A1 | 8/2008 | Shafirstein et al. | |

(Continued)

OTHER PUBLICATIONS

Beck, Melanie. "ML Security Pro Tips: Understanding MinHash in a Security Context", AI/ML at Symantec, Feb. 25, 2019 (Year: 2019).*

(Continued)

*Primary Examiner* — Shahid A Alam
(74) *Attorney, Agent, or Firm* — Schwegman Lundberg & Woessner, P.A.

(57) ABSTRACT

Systems and methods for managing content provenance are provided. A network system accesses a document of a plurality of documents to be analyzed. The network system extracts text fragments from the document including a first fragment and a second fragment. A determination is made whether each of the text fragments match an entry in a hash table. Based on a first fragment not matching any entries in the hash table, the network system creates a new entry in the hash table, whereby the first fragment is used to generate a key in the hash table. Based on a second fragment matching an entry of the hash table, the network system associates the document with a key of the matching entry in the hash table, whereby the associating comprising updating the hash table with an identifier of the document.

20 Claims, 9 Drawing Sheets

(56) References Cited

U.S. PATENT DOCUMENTS

| | | | |
|---|---|---|---|
| 2010/0145952 | A1 | 6/2010 | Yoon et al. |
| 2011/0270606 | A1 | 11/2011 | Crochet et al. |
| 2013/0151531 | A1* | 6/2013 | Li .................. G06F 16/355 707/740 |
| 2014/0082006 | A1 | 3/2014 | Knight et al. |
| 2016/0132521 | A1 | 5/2016 | Reininger et al. |
| 2016/0188590 | A1 | 6/2016 | Cole et al. |
| 2016/0379232 | A1* | 12/2016 | Alonso ............. G06F 16/9535 705/7.33 |
| 2017/0322930 | A1 | 11/2017 | Drew |
| 2018/0067910 | A1 | 3/2018 | Alonso et al. |
| 2018/0137115 | A1* | 5/2018 | Klein .................. G06F 16/325 |
| 2018/0181805 | A1 | 6/2018 | Asi |
| 2019/0347319 | A1* | 11/2019 | Goyal .................. G10L 15/22 |
| 2020/0300654 | A1 | 9/2020 | Bravi et al. |
| 2020/0314117 | A1 | 10/2020 | Nguyen et al. |
| 2020/0387743 | A1* | 12/2020 | Wick .................. G06F 16/2228 |
| 2021/0004583 | A1 | 1/2021 | Evans et al. |

OTHER PUBLICATIONS

Bendersky, et al., "Finding Text Reuse on the Web", In Proceedings of the Second ACM International Conference on Web Search and Data Mining, Feb. 9, 2009,10 Pages.

Clough, et al., "METER: MEasuring TExt Reuse", In Proceedings of the 40th Annual Meeting of the Association for Computational Linguistics (ACL), Jul. 6, 2002, pp. 152-159.

De Nies, et al., "Automatic Discovery of High-level Provenance Using Semantic Similarity", In Proceedings of International Provenance and Annotation Workshop, Jun. 19, 2012, pp. 97-110.

Flintham, et al., "Falling for Fake News: Investigating the Consumption of News via Social Media", In Proceedings of the CHI Conference on Human Factors in Computing Systems, Apr. 21, 2018, pp. 1-10.

Groth, et al., "Requirements for Provenance on the Web", In the International Journal of Digital Curation, vol. 7, Issue 1, Mar. 9, 2012, pp. 39-56.

Horne, et al., "An Exploration of Verbatim Content Republishing by News Producers", In repository of arXiv, arXiv:1805.05939, May 15, 2018, 10 Pages.

Schwarz, et al., "Augmenting Web Pages and Search Results to Support Credibility Assessment", In Proceedings of the SIGCHI Conference on Human Factors in Computing Systems, May 7, 2011, 10 Pages.

Seo, et al., "Local Text Reuse Detection", In Proceedings of the 31st Annual International ACM SIGIR Conference on Research and Development in Information Retrieval (SIGIR'08), Jul. 20, 2008, 8 Pages.

"Bing helps you learn more about the news in less time", Retrieved From: https://blogs.bing.com/search/2018-08/Bing-helps-you-learn-more-about-the-news-in-less-time, Aug. 27, 2018, 6 Pages.

"Jigsaw", Retrieved From: https://web.archive.org/web/20190401171703/https://jigsaw.google.com/, Apr. 1, 2019, 1 Page.

"Rogeting", Retrieved From: https://web.archive.org/web/20170416070248/https:/en.wikipedia.org/wiki/Rogeting, Apr. 16, 2017, 2 Pages.

"Scientometrics", Retrieved From: https://web.archive.org/web/20190428074832/https://en.wikipedia.org/wiki/Scientometrics, Apr. 28, 2019, 5 Pages.

"Stylometry", Retrieved from: https://web.archive.org/web/20190401083503/https://en.wikipedia.org/wiki/Stylometry, Apr. 1, 2019, 9 Pages.

Burt, Tom, "Announcing the Defending Democracy Program", Retrieved From: https://blogs.microsoft.com/on-the-issues/2018/04/13/announcing-the-defending-democracy-program/, Apr. 13, 2018, 3 Pages.

Shum, Harry, "Democratization of AI", Retrieved From: https://events.technologyreview.com/video/watch/harry-shum-democratization-ai/, Mar. 25, 2019, 4 Pages.

Shum, Harry, "Five things to know about the next cycle of AI innovation—AI Creation", Retrieved From: https://www.linkedin.com/pulse/five-things-know-next-cycle-ai-innovation-creation-harry-shum/, Mar. 26, 2019, 5 Pages.

Smith, et al., "Today in Technology: The Top 10 Tech Issues for 2019", Retrieved From: https://www.linkedin.com/pulse/today-technology-top-10-tech-issues-2019-brad-smith/?published=t, Jan. 8, 2019, 11 Pages.

"International Search Report and Written Opinion Issued in PCT Application No. PCT/US20/033895", dated Aug. 17, 2020, 12 Pages.

"International Search Report and Written Opinion Issued in PCT Application No. PCT/US20/034109", dated Aug. 17, 2020, 15 Pages.

"Non Final Office Action issued in U.S. Appl. No. 16/460,980", dated Jun. 15, 2021, 35 Pages.

"Non-Final Office Action Issued in U.S. Appl. No. 16/460,980", dated Mar. 8, 2022, 22 Pages.

* cited by examiner gun control

All News Images Videos Maps Shopping | My saves
2,180,000 Results  Any time

Spotlight on Gun Control >

Judge blocks online plans for printing untraceable 3D guns
naplesherald.com | Monday, August 27th 2018, 10:42:25 pm a us judge in seattle blocked the trump administration monday from allowing a texas company to post online plans for making untraceable 3d guns agreeing with 19 states and the district of columbia that such access to the plastic guns would pose a security risk.

the states sued to stop an agreement that the government had reached with austin texasbased defense distributed saying guidelines on how to print undetectable plastic guns could be acquired by felons or terrorists.

us district judge robert lasnik extended a temporary restraining order and his new decision will last until the case is resolved.

he said cody wilson owner of defense distributed wanted to post the plans online so that citizens can arm themselves without having to deal with licenses serial numbers and registrations wilson has said that "governments should live in fear or their citizenry" it is the untraceable and undetectable nature of these small firearms that poses a unique danger lasnik said.

"promising to detect the undetectable while at the same time removing a significant regulatory hurdle to the proliferation of these weapons both domestically and internationally rings hollow and in no way ameliorates much less avoids the harms that are likely to befall the states if an injunction is not issued" the state department had reached the settlement with the company after the agency removed the 3d gunmaking plans form a list of weapons or technical data that cannot be exported overseas.

they said the government was supposed to notify congress and provide a 30day window before making a change to that list but ii didi not.

www.ajc.com
Aug 27th 2018, 11:02am
6 sentences in article.
copied in 4122 additional articles
This site produces about 29% original content.
the remainder tends to be sourced from 94 other sites lemonwire.com
Aug 27th 2018, 11:03am
5 sentences in article.          608
copied in 541 additional articles
This site produces about 29% original content.
the remainder tends to be sourced from 116 other sites www.newser.com
Aug 27th 2018, 1:58pm
3 sentences in article.
copied in 2294 additional articles
This site produces about 30% original content.
the remainder tends to be sourced from 139 other sites lemonwire.com
Aug 27th 2018, 2:10pm
4 sentences in article.
copied in 214 additional articles
This site produces about 29% original content.
the remainder tends to be sourced from 116 other sites www.abqjournal.com
Aug 27th 2018, 3:33pm
1 sentence in article.
copied in 178 additional articles
This site produces about 30% original content.

FIG. 6B gun control

All News Images Videos Maps Shopping | My saves 2,180,000 Results   Any time

Spotlight on Gun Control >

School safety panel will recommend best practices in report
www.morningjournal.com|Friday, August 31st 2018, 3:46:29 pm WASHINGTON > > A federal panel convened after the deadly school shooting in Parkland Florida will issue a series of best practices to make schools safer including recommendations on arming teachers senior Education Department official told The Associated Press.

Age restrictions on gun purchases also are being considered.

Frank Brogan assistant secretary of elementary and secondary education also said the agency will let states decide whether they want to use federal grants purchase firearms for schools " Trump and Education Secretary Betsy DeVos have said that schools may benefit from having armed teachers should option.

Brogan cited the "school marshal" program in Texas where school employees can volunteer to carry weapons on campuses after undergoing training.

Educators from some remote rural schools also told the panel that they rely on armed school personnel because police may take too long to arrive.

Others however argued that arming teachers is dangerous and could make schools feel like prisons.

An early draft of the commission's report recommends that states and communities determine "based on unique circumstances each school" whether to arm its security personnel teachers be able respond violence.

The draft's section on training school personnel was reviewed by AP.

That approach the draft says "can be particularly helpful" in rural districts where nearest police unit may far away.

Other recommendations included employing school resource

DeVos says she won't take action on funding to arm teachers
www.msn.com|Friday, August 31st 2018, 4:03:36 pm WASHINGTON Education Secretary Betsy DeVos said Friday that she has "no intention of taking any action" regarding possible use federal funds to arm teachers or provide them with firearms training.

DeVos' comments came after a top official in her department asked about arming teachers said states and local jurisdictions always "had the flexibility" to decide how use federal education " President Donald Trump and DeVos have said that schools may benefit from having armed teachers should option.

DeVos said Friday that "Congress did not authorize me or the Department to make those decisions" about arming teachers training them on use of firearms.

Her comments were in a letter to Virginia Rep.

Bobby Scott the top Democrat on House committee overseeing education and were posted by department Twitter.

"I will not take any action that would expand or restrict the responsabilities and flexibilities granted to state local education agencies by Congress" DeVos wrote.

Democrats and education groups have argued however that the funds are intented for academics not guns.

DeVos heads a federal commission on school safety that was formed after the deadly Valentine's Day shooting at Florida high.

An early draft of the commission's report recommends that states and communities determine "based on unique circumstances each school" whether to arm its security personnel teachers be able respond violence.

The draft's section on training school personnel was reviewed

FIG. 6C

REVEALING CONTENT REUSE USING FINE ANALYSIS

TECHNICAL FIELD

The subject matter disclosed herein generally relates to special-purpose machines that facilitate revealing content reuse, and to the technologies by which such special-purpose machines become improved compared to other machines that reveal content reuse. Specifically, the present disclosure addresses systems and methods that identifies source content reuse based on connections between fragments of text within documents.

BACKGROUND

The media industry typically reuses news content. Conventionally, a small number of publishers originate content with a large number of other publishers duplicating or republishing the content. With the proliferation of content distribution on the Internet, it is difficult to identify where news originated from and how it is spreading. This allows for misinformation, disinformation, and plagiarism.

BRIEF DESCRIPTION OF DRAWINGS

Various ones of the appended drawings merely illustrate example embodiments of the present invention and cannot be considered as limiting its scope.

FIGS. 6A-6C are example user interfaces that illustrate the use of content provenance information.

DETAILED DESCRIPTION

Figure 1:
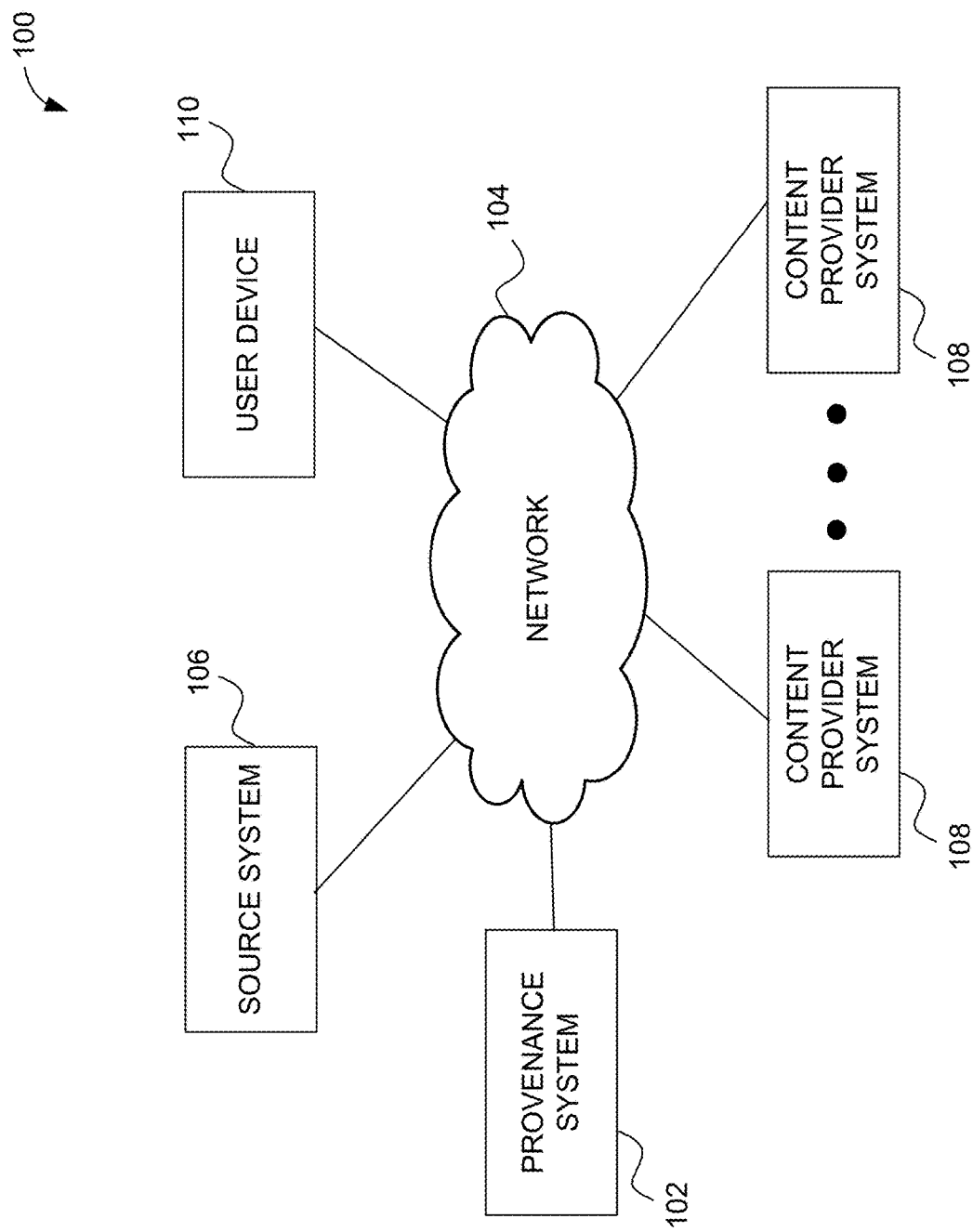
FIG. 1 is a diagram illustrating a network environment suitable for providing content provenance, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments are directed to a system and method that identifies source documents for content that is reused and identifies how the content has been modified or republished over time. This process is also referred to as content provenance. In particular, the system generates a table (e.g., a hash table) of content fragments or text fragments (e.g., sentences) found in documents of a document set. The values stored in the hash table are arrays. The text fragment is used to generate a hash key and a reference to a containing document (e.g., a document that contains the text fragment) is appended to the array. Hash collisions result in lists of documents containing the same text fragment. The hash table is then used to trace content of a document being viewed by a user back to its source(s) and reconstruct the provenance. In example embodiments, the documents comprise news articles. However, the document may contain any type of content that is reused or republished. While hash tables are discussed in example embodiments, any type of table or data structure can be used.

In example embodiments, the system accesses a plurality of documents. The plurality of documents may be associated with a particular subject matter or be for a particular period of time. The system extracts text fragments (also referred to as "content fragments") from each document including a first fragment and a second fragment. A determination is made whether each of the text fragments (or derived hash value or key from the content fragments) match an entry in a hash table for the document set. For example, based on a first fragment not matching any entries in the hash table, the system creates a new entry in the hash table, whereby the first fragment is used to generate a key (e.g., unique identifier) in the hash table. Further based on a second fragment matching an entry (e.g., a unique identifier corresponding to another text fragment) of the hash table, the network system associates the document with an identifier key of the matching entry in the hash table, whereby the associating comprising updating the hash table with an identifier of the document that contains the second text fragment corresponding to the matching entry. As such, each text fragment requires a unique identifier, an identifier for its containing document, and a hash value, in such a way that given a new text fragment, its hash value can be calculated and used to retrieve all prior content fragments with the same or similar hash value(s).

At run time, the system accesses the hash table to provide requested provenance information. In one embodiment, the system receives a selection of a document for analysis by a user. The system parses the selected document into a plurality of content fragments and performs a lookup in the hash table for each of the plurality of content fragments to determine whether each of the plurality of content fragments has a match (e.g., same hash value or key) or is sufficiently similar (e.g., similar hash value based on a predetermined similarity threshold). For matching content fragments of the plurality of content fragments, a source document from the hash table that contributed a matching content fragment is identified. The source document may be the oldest document associated with the matching content fragment in the hash table. The system then causes presentation of an identification of the source document relative to a corresponding matching fragment of the selected document (e.g., graphically linked to the content fragment in the selected document.

In another embodiment, the system compares content fragments between two documents. Accordingly, the system receives a selection of a first document and a second document for comparison and parses the first document and the second document into a plurality of content fragments. The system then performs a Jaccard scoring process (e.g., over words or n-grams of each content fragment) for the plurality of content fragments based on extracted words from the plurality of content fragments. Other text distance measures such as Levenshtein edit distance may also be used. Content fragments having a Jaccard score that exceeds a predetermine Jaccard threshold are identified. The system then causes presentation of a graphical relationship between the matching fragments found in both the first document and the second document.

Thus, the present disclosure provides technical solutions for managing content provenance that is automated and not subject to human bias or opinion. In particular, the system generates a hash table comprising entries of content fragments as identifier keys in the hash table and a list of documents from the document set that contains the corresponding content fragment. The hash table can then be used during runtime to provide provenance information including a source document for a document being viewed. As a result, one or more of the methodologies described herein facilitate solving technical problems associated with managing and analyzing large sets of documents (e.g., thousands to millions of documents) to reconstruct content provenance. By providing a provenance system that analyzes the documents using hashing and Jaccard scoring, example embodiments automate a process that is essentially humanly impossible to perform given the sheer number of documents published on a daily basis.

FIG. 1 is a block diagram illustrating an example environment 100 for providing content provenance, in accordance with an example embodiment. In example embodiments, a provenance system 102 is a network system comprising one or more servers that traces content back to its sources based on similarity of content in the documents. Accordingly, the provenance system 102 comprises components that analyze documents accessible on the Internet and generates a hash table of content fragments (also referred to as "fragments of text") and identification of documents that include the content fragments. Using the hash table, a source document for each content fragment is identified and can be presented to a user. In one embodiment, an oldest document corresponding to the content fragment is considered the source document. The provenance system 102 will be discussed in more detail in connection with FIG. 2 below.

The provenance system 102 accesses, via a communication network 104, a plurality of documents from a source system 106. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The source system 106 comprises a source of the documents that the provenance system 102 analyzes. In one embodiment, the source system 106 is a web search engine (e.g., Bing) with access to web content and documents from a plurality of content provider systems 108. In a news embodiment, the source system 106 may include a news vertical that provides access to news documents available on the Internet.

The content provider systems 108 are systems of content originators and publishers. In example embodiments, the content provider systems 108 comprises one or more servers. Content originators generate the content and may be the source of an original document (which may be referred to herein as the "source document"). Content publishers may be originators or may use content from other originators in generating documents (e.g., publications, news stories) that republish a portion of content generated by one or more other originators.

A client device 110 is a device of a user accessing content via the communications network 104. For example, the user may be an individual interested in viewing news articles about a particular topic and seeing the source of the articles. The client device 110 may comprise, but is not limited to, a smartphone, tablet, laptop, multi-processor system, microprocessor-based or programmable consumer electronic, game console, set-top box, a server, or any other communication device that the user may utilize to access the provenance system 102. In some embodiments, the client device 110 comprises a display module (not shown) to display information (e.g., in the form of user interfaces). In further embodiments, the client device 110 comprises one or more of a touch screen, accelerometer, camera, microphone, and Global Positioning System (GPS) device. The client device 110 may include one or more applications (also referred to as "apps") such as, but not limited to, a web browser, messaging application, electronic mail (email) application, and the like.

In example embodiments, any of the systems or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device. For example, the provenance system 102 and the source system 106 may be combined within a single system or be controlled by a single entity. Additionally, some of the functions of the provenance system 102 may be performed at the source system 106 or vice-versa. Furthermore, the functions described herein for any single system or device may be subdivided among multiple systems or devices. Additionally, any number of provenance systems 102, source systems 106, content provider systems 108, or client devices 110, may be embodied within the network environment 100. Further still, some components or functions of the network environment 100 may be combined or located elsewhere in the network environment 100.

Figure 2:
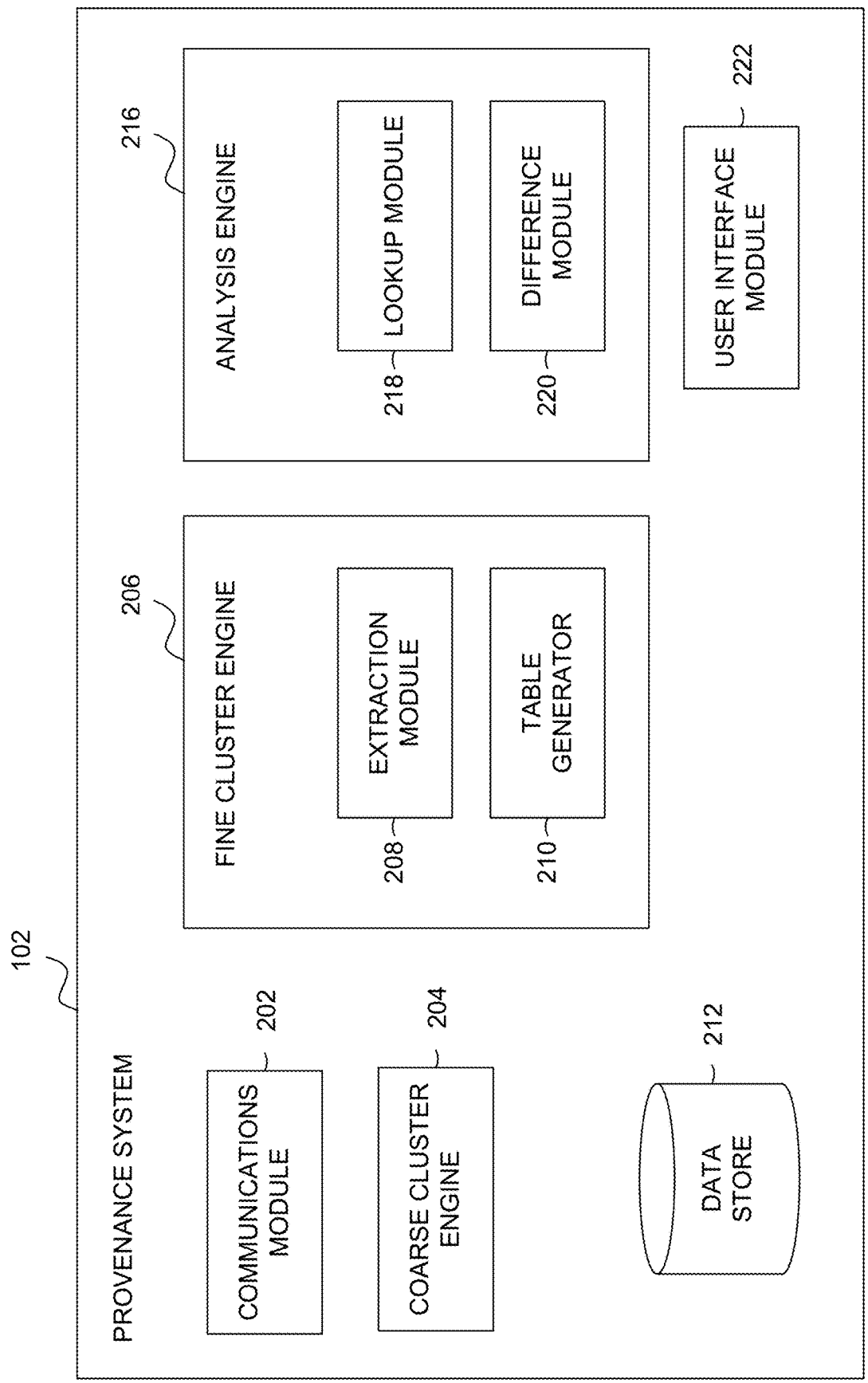
FIG. 2 is a block diagram illustrating components of a provenance system, according to some example embodiments.

FIG. 2 is a block diagram illustrating components of the provenance system 102, according to example embodiments. The provenance system 102 comprises components that analyze documents, generates a hash table that relates documents and their sources based on content fragments, stores the hash table for a document set, and provides analysis information regarding the relatedness of documents and their source(s) during runtime. To enable these operations, the provenance system 102 comprises a communications module 202, a coarse cluster engine 204, a fine cluster engine 206, a data store 212, an analysis engine 216, and a user interface module 222 all configured to communicate with each other (e.g., via a bus, shared memory, or a switch). The provenance system 102 may also comprise other components (not shown) that are not pertinent to example embodiments. Furthermore, any one or more of the components (e.g., engines, modules, storage) described herein may be implemented using hardware (e.g., a processor of a machine) or a combination of hardware and software. Moreover, any two or more of these components may be combined into a single component, and the functions described herein for a single component may be subdivided among multiple components. Further still, some of the components of the provenance system 102 may be located at the source system 106 or user device 110, in various embodiments.

The communications module 202 manages exchange of communications with the source system 106 and the client device 110. Specifically, the communications module 202 accesses (e.g., retrieves, receives) a plurality of documents (also referred to as "document set") from the source system 106 to be analyzed. In one embodiment, the plurality of documents is based on a query of a general subject matter that the communications module 202 transmits to the source system 106. The general subject matter may, for example, be a name (e.g., an individual, organization, country), a category (e.g., economy, sports), or a topic (e.g., gun control, school vouchers). In response, the source system 106 presents the provenance system 102 with documents (or a list of documents) associated with the queried subject matter. The query may also include a time period for when the documents were published (e.g., last three months). In an alternative embodiment, the plurality of documents comprises documents (regardless of subject matter) within a particular time frame (e.g., the query comprises a time frame filter).

The communications module 202 also exchanges communications, via the network 104, with the client device 110. For instance, when a user of the client device 110 requests additional information for a document they are viewing or wants to compare content between two documents, the communications module 202 receives the request from the client device 110 and responds with the requested information as will be discussed in more detail below.

The coarse cluster engine 204 is configured to generate clusters of related documents based on similarity of content within the documents. The coarse cluster engine 204 uses a machine learning technique to group documents into collections or clusters that share some common content features. In some embodiments, the coarse cluster engine 204 is able to identify documents that are so similar (e.g., based on a higher similarity requirement) that the documents may have derived from a common source or source document. In other cases, the coarse cluster engine 204 generates clusters that are loosely related documents (e.g. by subject matter) that then are used by the fine cluster engine 206.

In example embodiments, a hash component of the coarse cluster engine 204 hashes the documents accessed by the communication module 202. More specifically, the plurality of documents is reduced to a lower-dimensional representation that allows for distance-based or similarity-based comparisons between documents that would otherwise be infeasible. In one embodiment, the hash is a MinHash (the min-wise independent permutations locality sensitive hashing scheme) that reduces each document down to a set of fixed dimensions (e.g., 256 dimensions). MinHash operates on sets of document elements (e.g., words or n-grams) and estimates the Jaccard similarity of these sets for pairs of documents under comparison without needing to examine each element in each comparison or store each set in memory (as would be required for a full Jaccard comparison). In one embodiment, the documents are reduced to 256 dimensions, which effectively reduces the documents down to select content features generated by 256 hash functions. Alternative dimensionality-reduction approaches that are not conventionally referred to as hashing may also be used including text embedding methods such as doc2vec. In a further embodiment, Locality Sensitive Hashing (LSH) can be used with MinHash to quickly find related documents. For example, LSH can be run over the MinHash representation to construct a similarity matrix of all documents to one another.

Specifically, the coarse cluster engine 204 attempts to estimate the Jaccard similarity coefficient sets A and B, calculated as $|A \cap B|/|A \cup B|$. MinHash does this in a way that is mathematically equivalent to randomly sampling from the $A \cup B$ and checking for membership in $A \cap B$. This check returns a 1 for a match and a 0 for no match. An average over all values will give the actual Jaccard score, but this can be expensive for large sets of $A \cup B$. As such, example embodiments average over a fixed number of random samples (e.g., k=256).

The result of the hash is a vector of 1s and 0s based on which of the k hash functions (for each of k permutations) results in a same minimum hash value for elements of A and B. The vector is equivalent to a binary number and may be encoded as an integer. In some cases, a fuzzy match is derived whereby for a given segment of text (e.g., a paragraph) having minor changes between two documents, an exact same vector is output. In other cases, minor changes may result in different vectors. For example, minor changes may result in small changes to the binary hash components (changes 0<=>1) that only slightly reduce the similarity between the hash vectors (and can thus be interpreted as small differences). Minor changes may also go undetected if the changes occurred in document elements not sampled by one of the k hash functions.

Next, a distance component of the coarse cluster engine 204 determines similarities between each of the documents in the document set. In example embodiments, the distance component runs a pairwise Jaccard scoring between all document MinHash values (the MinHash strings). Jaccard scores express a ratio of overlapping content features between two documents (e.g., how many hashes in a first document are the same as hashes in a second document and how many are different). Documents with higher overlapping content features are, therefore, more similar to each other. The result is a distance matrix between all documents with each other document in the document set. Because the Jaccard score is a ratio, it has allowable values in the range 0 to 1, whereby 0 indicates no overlap and 1 means a perfect overlap. In other words, every document in the document set will have a single number that indicates what ratio of overlap there is with every other document in the document set.

Then, a clustering component of the coarse cluster engine 204 groups the documents in the document set into clusters whereby the documents within each cluster are similar to each other. In example embodiments, the clustering component uses DBSCAN (density-based spatial clustering of applications with noise) to calculate cluster boundaries. The Jaccard score for each pairwise document comparison comprises the distance function used in the DBSCAN. The primary tunable parameter in DBSCAN is the minimum density to allow for cluster formation, otherwise known as "epsilon." Epsilon essentially establishes a size of a radius with a larger value of epsilon expanding the radius to create a coarser cluster. However, the use of Jaccard similarity results in an inversion of epsilon. That is, for example, setting a Jaccard requirement to 0 effectively sets epsilon to the maximum value (e.g., 1.0) required to capture ail points (e.g., documents) in a single duster. For example, if the Jaccard requirement is 0.70 (e.g., epsilon=0.3), then the clusters will have documents having defining content that is roughly a minimum of 70% similar. The Jaccard requirement may be predetermined (e.g., a default) or set by a human operator of the provenance system 102. In some embodiments, the Jaccard requirement may be variable based on the subject matter of the documents.

The clusters generated by the coarse cluster engine 204 are "pre-buckets" of loosely related documents (e.g. by subject matter) that are then used by the fine cluster engine 206 to generate relationship information (e.g., a hash table) based on content fragments within the documents. That is, the coarse cluster engine 204 relates documents based on generally how similar documents are whereas the fine cluster engine 206 relates documents based on similar content fragments within the documents. In an alternative embodiment, the fine cluster engine 206 analyzes documents for a particular time period (e.g., for the last 3 months) or based on a query for documents associated with a subject matter. In this alternative embodiment, the coarse cluster engine 204 is optional or not needed.

The fine cluster engine 206 analyzes documents and generates a hash table that relates content within the documents and their sources. More specifically, the fine cluster engine 206 traces content fragments by identifying unique content fragments across a document set, identifying each document that contains the same or similar (if using fuzzy matching) content fragment, and building a hash table comprising the unique content fragments and identification of documents containing the content fragments. To enable these operations, the fine cluster engine 206 comprises an extraction module 208 and a table generator 210.

The extraction module 208 is configured to extract or parse content fragments in all the documents from the document set (e.g., the pre-bucket of related documents from the coarse cluster engine 204 or a document set from a particular time period or based on a query). In one embodiment, the content fragment is a sentence. Alternatively, the content fragment can comprise, for example, triplets of words, triplets of phrases, a paragraph, or text of any particular length (e.g., as set by an operator of the provenance system 102).

With each content fragment parsed by the extraction module 208, the table generator 210 determines whether the content fragment (or derived hash key from the content fragment) already has a matching entry in the table (e.g., has been identified from a previously document analyzed by the fine cluster engine 206). In some embodiments, the determination is based on an exact match—that is the content fragment parsed from a current document matches every word in the entry. In an alternative embodiment, a fuzzy match is allowed whereby a predetermined number of words in the content fragment of the current document matches the entry. For ease of discussion, "match" as used herein can refer to both exact match and fuzzy match. If an entry exists in the table that matches the content fragment, then the table generator 210 updates the table to indicate that the current document also contains the content fragment (e.g., adds an identifier of the current document to a list of documents containing the content fragment). If no entry matches the content fragment, the table generator 210 uses the content fragment to generate a new unique entry (e.g., a new identifier key in the table). This process is repeated for every content fragment in every document of the document set. As a result, the hash table comprises a master list of every content fragment in the document set whereby each content fragment has a corresponding list of documents where that content fragment can be found.

The hash table (for each document set) is stored to the data store 212. During runtime, the data store 212 may be accessed, by the analysis engine 216, to quickly find, for example, related documents (e.g., from the same document set) and a likely source document of a document being viewed. While the data store 212 is shown as being a part of the provenance system 102, alternatively, the data store 212 may be located elsewhere in the network environment 100.

At runtime, the provenance system 102 receives, via the communications module 202, an indication to present provenance information to a user at the client device 110. The indication may be received from the client device 110 directly or via the source system 106. In one example, the user is viewing a document and wants to see content provenance such as a source document of a content fragment within the document. In another example, the user selects two related documents to see overlap of content fragments found in both documents. The request can cause the analysis engine 216 to access the data store 212 and determine the provenance information. Accordingly, the analysis engine 216 includes a lookup module 218 and a difference module 220. In some embodiments, the analysis engine 216 may be located at the source system 106.

For an embodiment where the user is viewing a document and wants to see provenance information, the lookup module 218 parses the content fragments in the document being viewed and performs a lookup in the hash table corresponding to the document set that the document being viewed is a part of. If the lookup module 218 finds a matching content fragment in the hash table (e.g., finds a matching identifier key or entry that matches an extracted content fragment from the document), the lookup module 218 identifies a list of documents from the document set that also contain the same content fragment. In one embodiment, the lookup module 218 sorts the list of documents to identify the oldest document on the list (e.g., oldest publication date). This oldest document is deemed the source document for the content fragment. The lookup module 218 can also perform some analysis to provide various statistics about the source document as will be discussed further below. This lookup process continues for each extracted content fragment in the document being viewed.

For an embodiment where the user selects two related documents to see overlap of content fragments found in both documents, the difference module 220 determines how the two documents have changed. In one embodiment, one of the related documents (e.g., a first document) is a source of the second document (e.g., contains one or more content fragments that were copied by the other document). For example, the user may be viewing the second document, see that the first document is a source of one or more content fragments in the second document (e.g., as identified by the lookup module 218). The user can request a comparison of these two documents.

The difference module 220 performs a fragment-by-fragment (e.g., sentence-by-sentence) matching process or algorithm. As such, the difference module 220 splits each document into content fragments and compares each content fragment in the first document to each content fragment in the second document. In one embodiment, the difference module 220 parses words in each content fragment and uses a Jaccard scoring method to find matches that mostly overlap in content. The difference module 220 can have a predetermined threshold whereby a Jaccard score above the predetermined threshold results in the difference module 220 highlighting the similarity/differences between the matching content fragments. For example, a 64% match (0.64 Jaccard score) will be highlighted by the difference module 220, while a 13% match (0.13 Jaccard score) will likely not be highlighted.

The user interface (UI) module 222 causes the presentation of the response to the request. For instance, the UI module 222 transmits instructions for presenting provenance information determined by the lookup module 218 or the difference module 220. For example, the UI module 216 can present information that allows the user to visually compare content fragments between two documents or view a source document for a content fragment along with statistics for the source document. Examples of various runtime user interfaces are discussed in more detail in connection with FIGS. 6A to 6C below.

Figure 3:
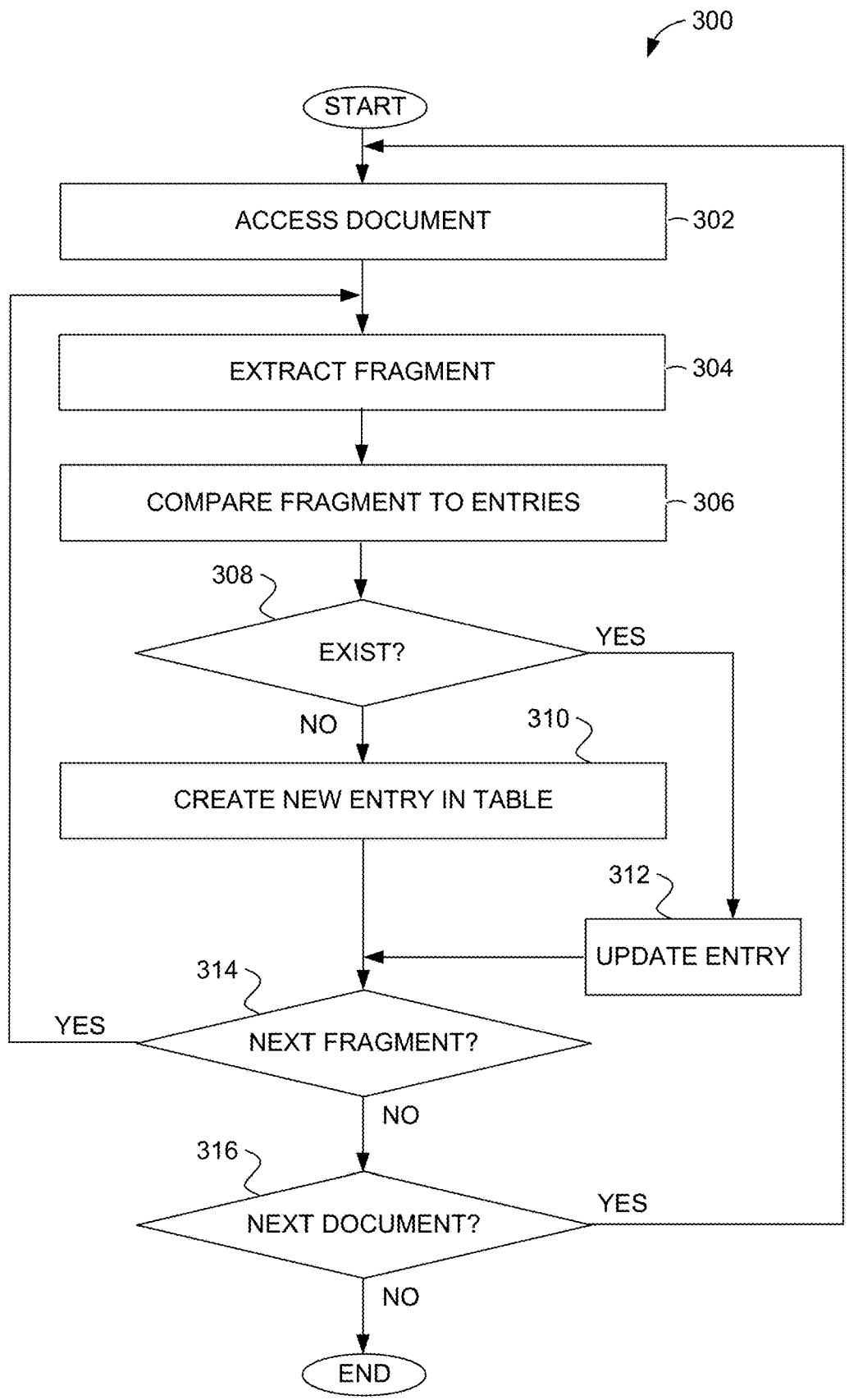
FIG. 3 is a flowchart illustrating operations of a method for generating provenance information, according to some example embodiments.

FIG. 3 is a flowchart illustrating operations of a method 300 for generating provenance information, according to some example embodiments. Operations in the method 300 may be performed by the provenance system 102, using components described above with respect to FIG. 2. Accordingly, the method 300 is described by way of example with reference to the provenance system 102. However, it shall be appreciated that at least some of the operations of the method 300 may be deployed on various other hardware configurations or be performed by similar components residing elsewhere in the network environment 100. Therefore, the method 300 is not intended to be limited to the provenance system 102.

The method 300 is triggered by a request for the provenance system 102 to analyze a document set. The document set may comprise a "pre-bucket" of related documents generated by the coarse cluster engine 204 in accordance with one embodiment. Alternatively, the document set is based on documents accesses for a particular time period (e.g., for the last 3 months) or based on a query for documents associated with a subject matter (e.g., the communications module 302 queries the source system 106 for documents associated with a particular subject matter).

In operation 302, the communications module 202 accesses a document of the document set. For example, the communications module 202 can retrieve the document from the source system 102. In other example, the document is transmitted from the source system 102 to the communications module 202 in response to a request from the communication module 202.

In operation 304, the extraction module 208 extracts a content fragment from the document. In one embodiment, the content fragment is a sentence. In an alternative embodiment, the content fragment can comprise, for example, triplets of words, triplets of phrases, a paragraph, or text of any length. The length can be determined by an operator of the provenance system 102.

In operation 306, the table generator 210 compares the extracted content fragment or derived hash key from the content fragment to entries in a hash table (e.g., identifier/hash keys in the hash table that represent content fragments from previously analyzed documents). In some embodiments, the determination is based on an exact match. In an alternative embodiment, a fuzzy match is allowed whereby a predetermined number of words or n-grams in the content fragment of the document matches the entry in the hash table. By using n-grams, the comparison requires that local word order be preserved (e.g., the same words in the same order). In general, for Jaccard comparisons over n-grams, substituting a word will remove the n-grams in which the original word occurs and add n-grams containing the new word, giving a change of $2n$. For small changes not to have an outsized effect on similarity measures, example embodiments keep n small (e.g., n=2 or 3).

In operation 308, a determination is made as to whether a matching entry is found in the hash table (e.g., stored in the data store 212). If a matching entry is not found in the hash table, then the table generator 210 creates a new entry in the hash table using the content fragment to generate the identifier key (e.g., hash key) and identifies the document that the new entry is from. As such, the content fragment becomes a key in the hash table.

If a matching entry is found in the hash table in operation 308, then in operation 312, the table generator 210 updates the matching entry with an identifier of the document (e.g., appends the identifier of the document to a list of documents containing the matching entry). As such, each entry in the hash table has a corresponding list of documents that contain the unique content fragment of the entry.

In operation 314, a determination is made by the extraction module 208 whether a next fragment in the document exists. If there is a next fragment in the document, the method 300 returns to operation 304 and the next fragment is extracted by the extraction module 208. If there is not a next fragment in the document, the method 300 proceeds to operation 316 where a determination is made by the extraction module 208 whether there is another document to be analyzed in the document set. If there is another document to be analyzed, then the method 300 returns to operation 302 where the next document is accessed for analysis.

Figure 4:
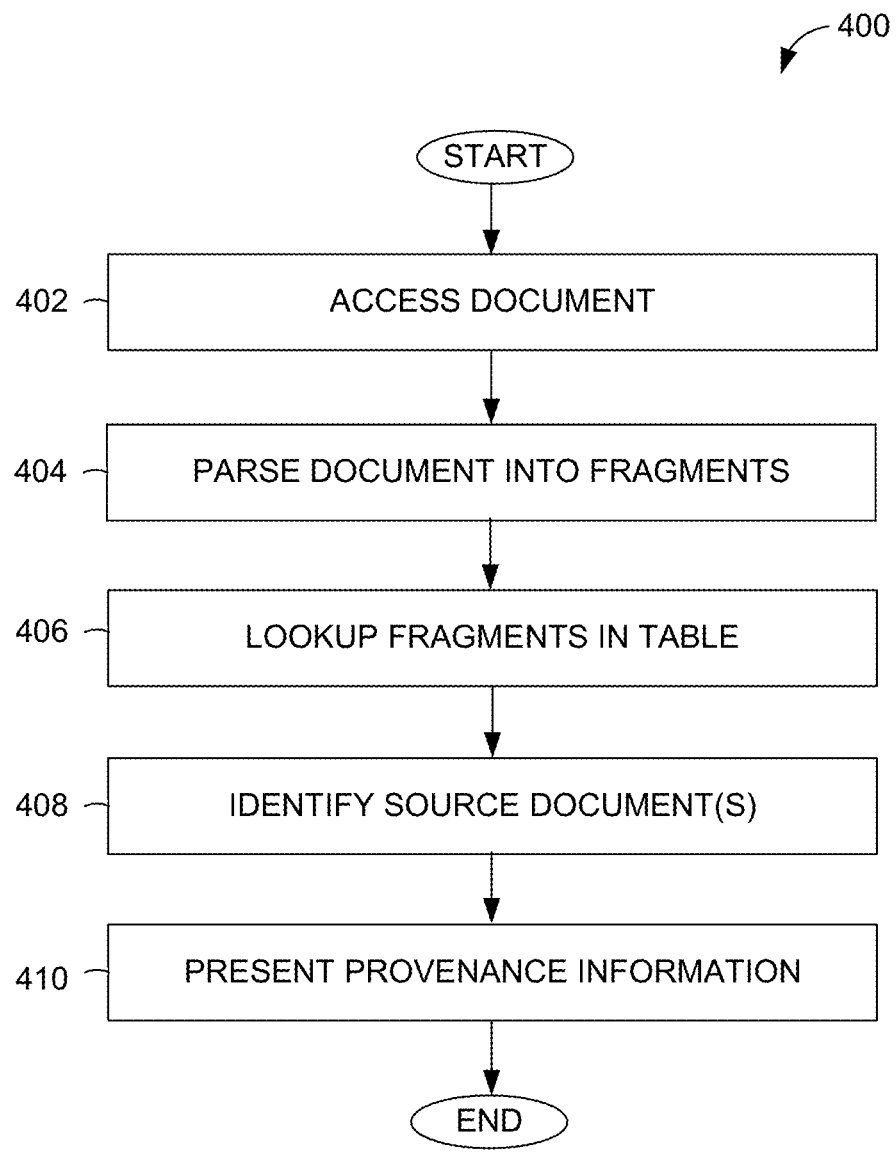
FIG. 4 is a flowchart illustrating operations of a method for presenting provenance information for a single document, according to some example embodiments.

FIG. 4 is a flowchart illustrating operations of a method 400 for presenting provenance information for a single document, according to some example embodiments. Operations in the method 400 may be performed by the provenance system 102, using components described above with respect to FIG. 2. Accordingly, the method 400 is described by way of example with reference to the provenance system 102. However, it shall be appreciated that at least some of the operations of the method 400 may be deployed on various other hardware configurations or be performed by similar components residing elsewhere in the network environment 100. Therefore, the method 400 is not intended to be limited to the provenance system 102.

At runtime, the provenance system 102 receives, via the communications module 202, an indication to present provenance information to a user at the client device 110 while the user is viewing a document. In response, the communications module 202 accesses the document in operation 402.

In operation 404, the lookup module 218 parses the document accessed in operation 402 into content fragments. The content fragments may be a sentence, a set number of words or phrases, or any other length of text.

In operation 406, the lookup module 218 looks up each content fragment in the hash table associated with the document (e.g., hash table for the document set that the document is a part of) to fine a match. The match may be an exact match or a fuzzy match depending on the embodiment (e.g., may be set by an operator of the provenance system 102).

For each content fragment that has a matching entry in the hash table, the lookup module 218, in operation 408, identifies a source document for a corresponding content fragment. In one embodiment, the lookup module 218 sorts the list of documents corresponding to the entry in the hash table to identify the oldest document on the list. This oldest document is deemed the source document for the content fragment.

In operation 410, the user interface module 216 causes presentation of the provenance information. Depending on the embodiment, the lookup module 218 or the table generator 210 performs analysis to provide various statistics about the source document that is presented as part of the provenance information. For example, the statistics can include a number of content fragments the source document contributed to the document being viewed by the user, a number of other documents that contain the same content fragment, and a number of times the content fragment has been republished over a particular time period (e.g., republished 857 times over 8 days). The statistics can also include a percentage of original content generated by the originator (e.g., domain) of the source document and a number of other originators/publishers that contribute content to the originator (e.g., the originator produces about 30% original content; the remainder tends to be sourced from 139 other sites). Examples of user interfaces presenting provenance information are discussed in more detail in FIGS. 6A to 6C below.

Figure 5:
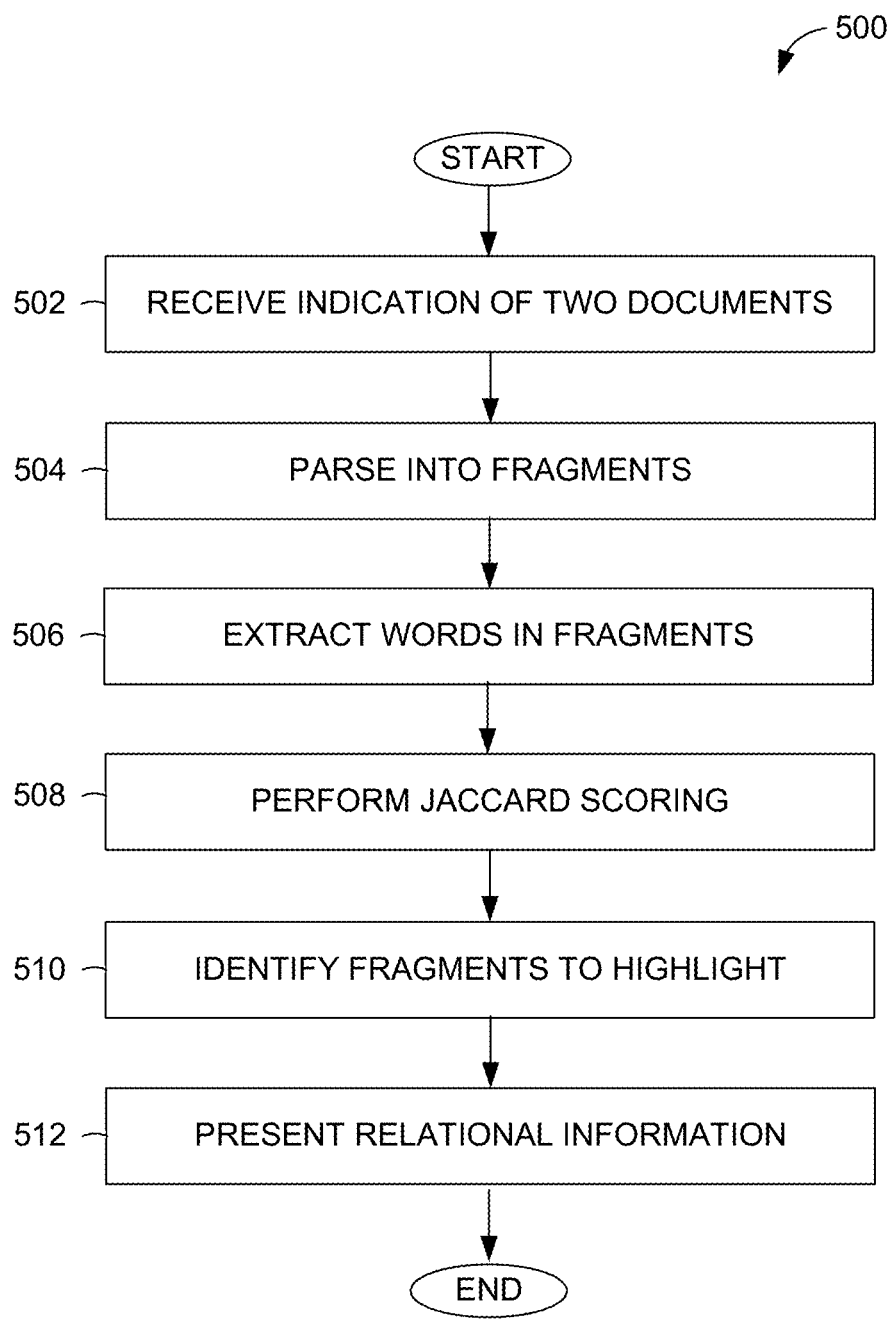
FIG. 5 is a flowchart illustrating operations of a method for presenting provenance information by comparing content of two documents, according to some example embodiments.

FIG. 5 is a flowchart illustrating operations of a method 500 for presenting provenance information comparing content of two documents, according to some example embodiments. Operations in the method 500 may be performed by the provenance system 102, using components described above with respect to FIG. 2. Accordingly, the method 500 is described by way of example with reference to the provenance system 102. However, it shall be appreciated that at least some of the operations of the method 500 may be deployed on various other hardware configurations or be performed by similar components residing elsewhere in the network environment 100. For example, some of the operations may occur at the user device 110 (i.e., "the client") or the source system 106 (e.g., some of the components/functionalities of the provenance system 102 are located at the client or source system 106). Therefore, the method 500 is not intended to be limited to the provenance system 102.

In operation 502, the communications module 202 receives an indication of two documents to be compared. In example embodiments, a first document of the two documents is a source of a second document of the two documents. For example, the user may be viewing the second document, see that the first document is a source of one or more content fragments in the second document (e.g., as identified by the lookup module 218). The user can request a comparison of these two documents. Alternatively, the user is presented with a plurality of documents and can select any two documents for comparison.

In operation 504, the difference module 220 parses the first and second documents into content fragments. For content fragments that appear to be similar between the two documents, the difference module 220 extract words from these content fragments in operation 506. For example, if the two documents have already been analyzed by the provenance system 102 (e.g., by the coarse cluster engine 204), then a cluster of sufficiently similar content fragments for each fragment in each document already exists. Alternatively, for only a pair of documents, the fragment analysis process can occur locally in the client.

In operation 508, the difference module 220 performs a Jaccard scoring method using the extracted words to determine a similarity score for the content fragments containing the words. For example, a first content fragment in the first document can have a 0.64 Jaccard score with a second content fragment in the second document which indicates that 64% of the words in the first content fragment overlaps with the second content fragment.

In operation 510, the difference module 220 identifies content fragments to highlight to the user. In example embodiments, a predetermined Jaccard threshold is used to determine the content fragments to highlight, whereby a Jaccard score above the predetermined Jaccard threshold results in the difference module 220 highlighting the similarity/differences between the matching content fragments. For example, a 0.64 Jaccard score will be highlighted by the difference module 220, while a 0.13 Jaccard score will likely not be highlighted.

In operation 512, the user interface module 222 graphically presents relational information between the two documents. In one embodiments, matching content fragments to be highlighted are a same color and a line drawn between the two matching content fragments. The line may also be the same color as the highlighted content fragments. This allows the user to view where the content fragment can be found between the two documents and also view changes made between the two content fragments as well as between the documents (e.g., content found in one document and not the other).

Figure 6A:
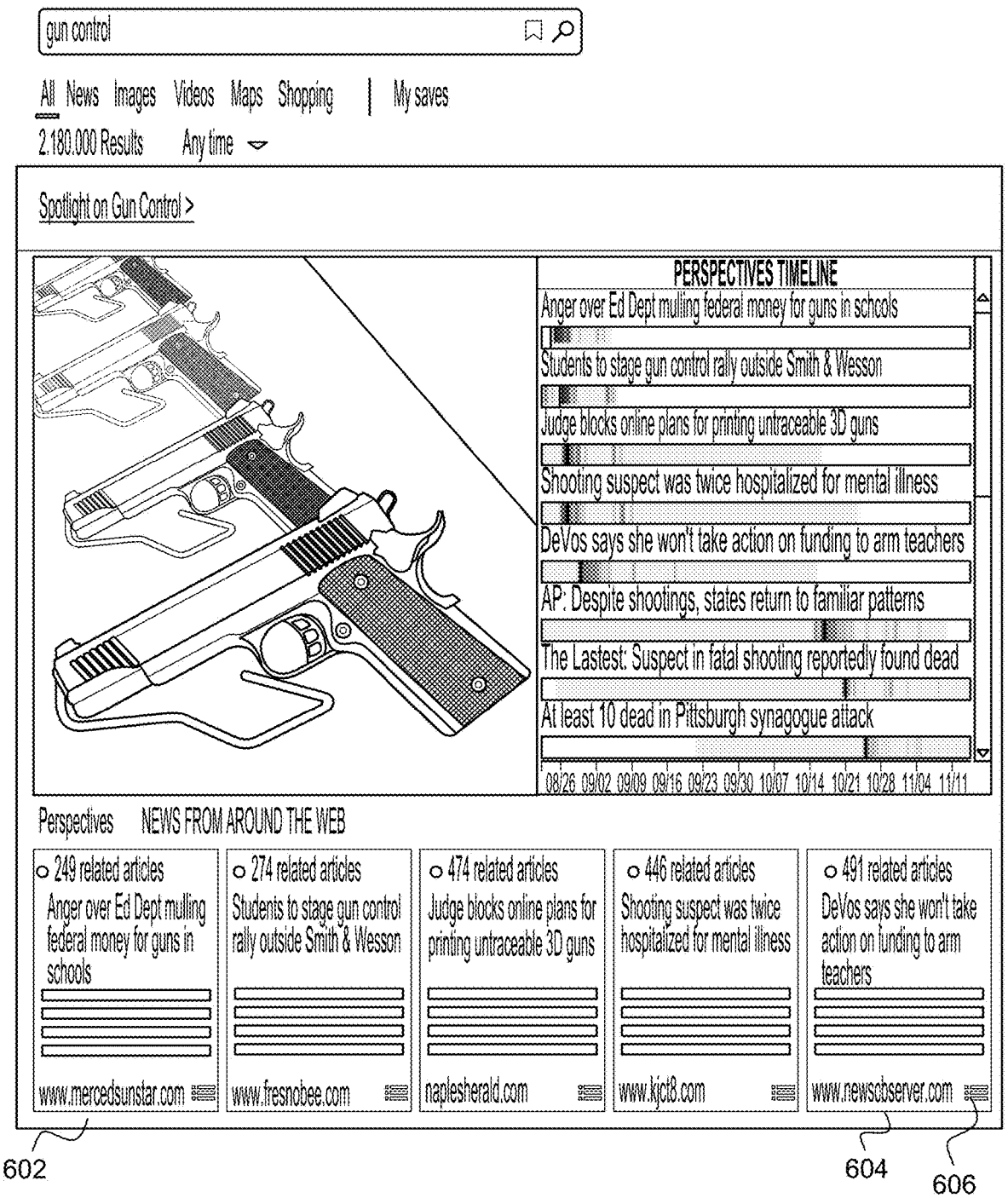

FIGS. 6A to 6C are example user interfaces that illustrate the use of content provenance information. The example user interfaces are associated with a search engine that presents news articles as the documents. In example embodiments, the user at the client device 110 selects a topic of interest. For example, the user may perform a search for a particular topic or select a topic from a display of multiple topics (e.g., a category list). For instance, the user can select the topic of gun control. Once the topic is selected, the search engine returns different articles or documents related to the topic. In one embodiment, the documents returned are presented in a perspective section 602 on the user interface as cards 604 as shown in FIG. 6A. The user interface shows the cards 604 having a selectable source analysis icon 606.

By selecting the source analysis icon 606, a domain sourcing view is presented in the user interface. An example of the domain sourcing view is shown in FIG. 6B. On a left side of the user interface are content fragments of the document of the selected source analysis icon 606 (referred to as the "selected document"). In example embodiments, the lookup module 218 parses the content fragments in the selected document and performs a lookup in the hash table corresponding to the document set that the selected document is a part of. The lookup module 218 finds the content fragments in the hash table and identifies the list of documents from the document set that also contain the content fragments. The lookup module 218 sorts the list of documents for each matching content fragment to identify the oldest document on the list. This oldest document is deemed the source document for the content fragment. In one embodiment, the lookup module 218 uses an exact match, in which case, the source document may not be the actual first article but one that has the exact same content fragment.

Information regarding the source document is then presented on the right side of the user interface in FIG. 6B with a graphical link (e.g., a line) that connects the information of the source document to each matching content fragment found in the selected document. The information of the source document may include one or more of a domain (e.g., website corresponding to the publisher of the source document), a date that the source document was published, number of content fragments found in the selected document from the source document, and a number of time the same content fragment was copied by other documents/articles. The information may also include an indication of how much original content is produced by the domain (e.g., the website) of the source document and an indication of where the rest of the content for the domain is obtained from (e.g., a number of other sources or publishers). Each article contains multiple sentences or content fragments and each publisher publishes multiple articles. In example embodiments, the provenance system 102 can "roll up" reuse statistics from the article level to the publisher level by looking at all sentences or content fragments in all articles from a given publisher and calculating a proportion of original/reused content.

When the user hovers over a content fragment in the selected document, all content fragments from the same source document are highlighted (e.g., shown in a different color). Additionally, the graphical link is highlighted in a same color as the highlighted content fragments. This allows the user to quick identify all the content fragments from the same source document.

The information of the source document also includes a bar graph 608. The bar graph 608 provides a breakdown of sources (e.g., by color) that the domain of the source document gets it content from. If the user selects the bar graph 608, the selected bar graph 608 expands to show more details. In one embodiment, the expanded bar graph shows details of where the domain gets its content from in descending order (e.g., a list of other domains in descending order of contribution to the source domain). The expanded bar graph may also show a corresponding portion of the bar graph in a same color as the non-expanded bar graph 608.

While the example of FIG. 6B provides provenance information while viewing a selected document, alternative embodiments may present provenance information in a search process. For example, when a user provides a search request to a search engine, the results of the search can be presented with an indication of percentage of original content and percentage of reused content. In this embodiment, the data from the hash table generated by the fine cluster engine 206 is leveraged without viewing the text within the document. Instead a summary of the document is provided.

In another alternative example, the user is viewing the document and selects or hovers over a content fragment (e.g., a sentence). The selection or hover causes a dropdown menu to be shown whereby the dropdown menu shows variations of the content fragment from other documents in the document set and how often each variation is republished.

In another embodiment, the user at the client device 110 selects a topic of interest (e.g., gun control). Once the topic is selected, the search engine returns different articles or documents related to the topic. Similar to the user interface shown in FIG. 6A, the user interface shows cards representing the documents. Instead of, or in addition to, the source analysis icon 606, a comparison icon is presented on the cards. The user selects two of the documents by selecting their respective comparison icon. In one embodiment, a first comparison icon turns green when selected and a second comparison icon turns orange when selected and opens a comparison panel (e.g., causes a comparison user interface to be shown) as shown in FIG. 6C.

FIG. 6C shows a comparison of content fragments between the two selected documents. In the example of FIG. 6C, the content fragments are sentences. The document on the left is the first document selected (e.g., the first comparison icon selected) and the document on the right is the second document selected. Matching content fragments (e.g., sentences) between the two documents are shown in a same color and a line drawn between them (shown as different dashed lines). Uncolored content fragments are unique to that document. The combination of colored and uncolored content fragments shows how content is shared across the documents and how the documents have been changed. In example embodiments, a fuzzy match of greater than 50% (e.g., Jaccard score of 0.50) indicates a match that is highlighted. Fuzzy matching allows the user to view minor changes between the content fragments.

Figure 7:
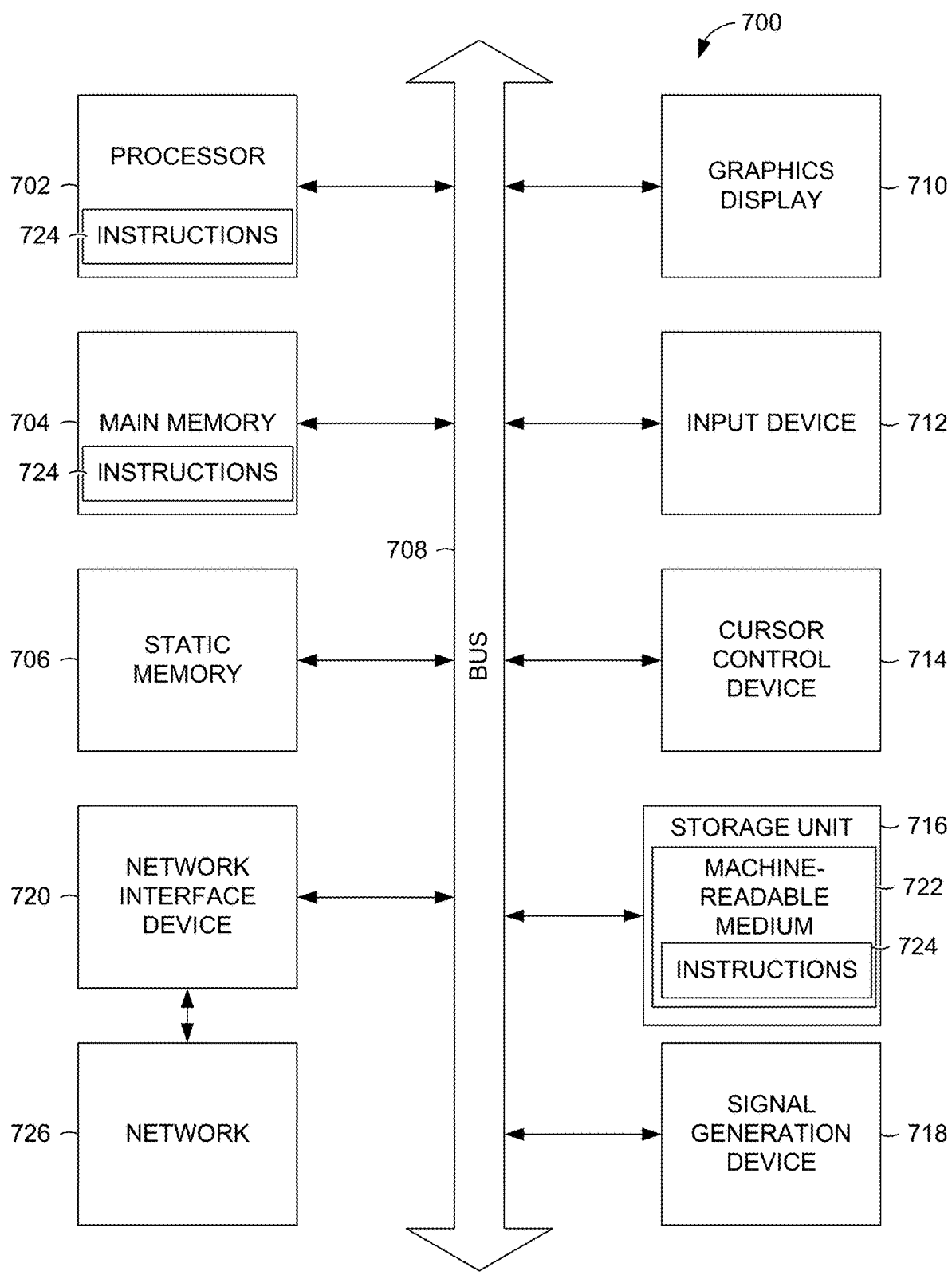
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 3-5. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 1002 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 (e.g., a tangible machine-readable storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for managing content provenance. The method comprises accessing, by a networked system, a document of a plurality of documents to be analyzed; extracting, by a processor of the network system, text fragments from the document including a first fragment and a second fragment; determining, by the network system, whether each of the text fragments or derived hash keys from the text fragments matches an entry in a hash table; based on a first fragment not matching any entries in the hash table, creating, by the network system, a new entry in the hash table, the first fragment being used to generate a key for the new entry in the hash table; and based on a second fragment matching an entry of the hash table, associating the document with a key of the matching entry in the hash table, the associating comprising updating the hash table with an identifier of the document.

In example 2, the subject matter of example 1 can optionally include determining the plurality of documents to be analyzed, the determining comprising using hashing and similarity scoring to identifier clusters of related documents, the plurality of documents being one of the clusters of related documents.

In example 3, the subject matter of any of examples 1-2 can optionally include wherein the hashing comprises Min-Hash and the similarity scoring comprises Jaccard scoring.

In example 4, the subject matter of any of examples 1-3 can optionally include wherein the text fragments comprise sentences.

In example 5, the subject matter of any of examples 1-4 can optionally include wherein the key in the hash table represents a text fragment from a previously analyzed document.

In example 6, the subject matter of any of examples 1-5 can optionally include wherein the match is a fuzzy match.

In example 7, the subject matter of any of examples 1-6 can optionally include receiving a selection of a document for analysis by a user; parsing the selected document into a plurality of fragments; performing a lookup in the hash table for each of the plurality of fragments to determine whether each of the plurality of fragments has a match; for matching fragments of the plurality of fragments, identifying a source document from the hash table that contributed a matching fragment; and causing presentation of an identification of the source document relative to a corresponding matching fragment of the selected document.

In example 8, the subject matter of any of examples 1-7 can optionally include wherein the causing the presentation further comprises causing presentation of a bar chart for the source documents, the bar chart illustrating a breakdown of sources that a domain of the source document gets its content from.

In example 9, the subject matter of any of examples 1-8 can optionally include wherein the causing the presentation further comprises causing presentation of statistics of the source document, the statistics including one or more of a publication date of the source document, a number of fragments contributed to the selected document by the source document, and a number of other documents having the matching segment of the source document.

In example 10, the subject matter of any of examples 1-9 can optionally include receiving a selection of a first document and a second document for comparison; parsing the first document and the second document into a plurality of content fragments; performing a Jaccard scoring process for the plurality of content fragments based on extracted words from the plurality of content fragments; identifying content fragments having a Jaccard score that exceeds a predetermine Jaccard threshold; and causing presentation of a graphical relationship between the matching fragments found in both the first document and the second document.

Example 11 is a system for managing content provenance. The system includes one or more processors and a storage device storing instructions that, when executed by the one or more hardware processors, causes the one or more hardware processors to perform operations comprising accessing a document of a plurality of documents to be analyzed; extracting text fragments from the document including a first fragment and a second fragment; determining whether each of the text fragments or derived hash keys from the text fragments matches an entry in a hash table; based on a first fragment not matching any entries in the hash table, creating a new entry in the hash table, the first fragment being used to generate a key for the new entry in the hash table; and based on a second fragment matching an entry of the hash table, associating the document with a key of the matching entry in the hash table, the associating comprising updating the hash table with an identifier of the document.

In example 12, the subject matter of example 11 can optionally include wherein the operations further comprise determining the plurality of documents to be analyzed, the determining comprising using hashing and similarity scoring to identifier clusters of related documents, the plurality of documents being one of the clusters of related documents.

In example 13, the subject matter of any of example 11-12 can optionally include wherein the hashing comprises Min-Hash and the similarity scoring comprises Jaccard scoring.

In example 14, the subject matter of any of examples 11-13 can optionally include wherein the key in the hash table represents a text fragment from a previously analyzed document.

In example 15, the subject matter of any of examples 11-14 can optionally include wherein the match is a fuzzy match.

In example 16, the subject matter of any of examples 11-15 can optionally include wherein the operations further comprise receiving a selection of a document for analysis by a user; parsing the selected document into a plurality of fragments; performing a lookup in the hash table for each of the plurality of fragments to determine whether each of the plurality of fragments has a match; for matching fragments of the plurality of fragments, identifying a source document from the hash table that contributed a matching fragment; and causing presentation of an identification of the source document relative to a corresponding matching fragment of the selected document.

In example 17, the subject matter of any of examples 11-16 can optionally include wherein the causing the presentation further comprises causing presentation of a bar chart for the source documents, the bar chart illustrating a breakdown of sources that a domain of the source document gets its content from.

In example 18, the subject matter of any of examples 11-17 can optionally include wherein the causing the presentation further comprises causing presentation of statistics of the source document, the statistics including one or more of a publication date of the source document, a number of fragments contributed to the selected document by the source document, and a number of other documents having the matching segment of the source document.

In example 19, the subject matter of any of examples 11-18 can optionally include wherein the operations further comprise receiving a selection of a first document and a second document for comparison; parsing the first document and the second document into a plurality of content fragments; performing a Jaccard scoring process for the plurality of content fragments based on extracted words from the plurality of content fragments; identifying content fragments having a Jaccard score that exceeds a predetermine Jaccard threshold; and causing presentation of a graphical relationship between the matching fragments found in both the first document and the second document.

Example 20 is a machine-storage medium storing instructions for managing content provenance. The machine-storage medium configures one or more processors to perform operations comprising accessing a document of a plurality of documents to be analyzed; extracting text fragments from the document including a first fragment and a second fragment; determining whether each of the text fragments or derived hash keys from the text fragments matches an entry in a hash table; based on a first fragment not matching any entries in the hash table, creating a new entry in the hash table, the first fragment being used to generate a key for the new entry in the hash table; and based on a second fragment matching an entry of the hash table, associating the document with a key of the matching entry in the hash table, the associating comprising updating the hash table with an identifier of the document.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
performing, by a network system, coarse clustering using DBSCAN to determine a plurality of documents to be analyzed that share common content features;
accessing, by the network system, a document of the plurality of documents to be analyzed;
extracting, by a processor of the network system, text fragments from the document including a first fragment and a second fragment;
determining, by the network system, whether each of the text fragments or derived hash keys from the text fragments matches an entry in a hash table created by the network system from analysis of previous documents;
based on a first fragment not matching any entries in the hash table, creating, by the network system, a new entry in the hash table and including an indication of the document that the new entry is from, the first fragment being used to generate a key for the new entry in the hash table; and
based on a second fragment matching an entry of the hash table, associating the document with a key of the matching entry in the hash table, the associating comprising updating the hash table by adding an identifier of the document to a list of one or more documents containing the second fragment.

2. The method of claim 1,
wherein performing coarse clustering comprises using hashing and similarity scoring to identify clusters of related documents, the plurality of documents being one of the clusters of related documents.

3. The method of claim 2, wherein the hashing comprises MinHash and the similarity scoring comprises Jaccard scoring.

4. The method of claim 1, wherein the text fragments comprise sentences.

5. The method of claim 1, wherein the key in the hash table represents a text fragment from a previously analyzed document.

6. The method of claim 1, wherein the match is a fuzzy match.

7. The method of claim 1, further comprising:
receiving a selection of a document for analysis by a user;
parsing the selected document into a plurality of fragments;
performing a lookup in the hash table for each of the plurality of fragments to determine whether each of the plurality of fragments has a match;
for matching fragments of the plurality of fragments, identifying a source document from the hash table that contributed a matching fragment; and causing presentation of an identification of the source document relative to a corresponding matching fragment of the selected document.

8. The method of claim 7, wherein the causing the presentation further comprises causing presentation of a bar chart for the source documents, the bar chart illustrating a breakdown of sources that a domain of the source document gets its content from.

9. The method of claim 7, wherein the causing the presentation further comprises causing presentation of statistics of the source document, the statistics including one or more of a publication date of the source document, a number of fragments contributed to the selected document by the source document, and a number of other documents having the matching segment of the source document.

10. The method of claim 1, further comprising:
receiving a selection of a first document and a second document for comparison;
parsing the first document and the second document into a plurality of content fragments;
performing a Jaccard scoring process for the plurality of content fragments based on extracted words from the plurality of content fragments;
identifying content fragments having a Jaccard score that exceeds a predetermine Jaccard threshold; and
causing presentation of a graphical relationship between the matching fragments found in both the first document and the second document.

11. A system comprising:
one or more hardware processors; and
a storage device storing instructions that, when executed by the one or more hardware processors, causes the one or more hardware processors to perform operations comprising:
performing, by a network system, coarse clustering using DBSCAN to determine a plurality of documents to be analyzed that share common content features;
accessing a document of the plurality of documents to be analyzed;
extracting text fragments from the document including a first fragment and a second fragment;
determining whether each of the text fragments or derived hash keys from the text fragments matches an entry in a hash table created by the network system from analysis of previous documents;
based on a first fragment not matching any entries in the hash table, creating a new entry in the hash table and including an indication of the document that the new entry is from, the first fragment being used to generate a key for the new entry in the hash table; and
based on a second fragment matching an entry of the hash table, associating the document with a key of the matching entry in the hash table, the associating comprising updating the hash table by adding an identifier of the document to a list of one or more documents containing the second fragment.

12. The system of claim 11, wherein performing coarse clustering comprises
using hashing and similarity scoring to identify clusters of related documents, the plurality of documents being one of the clusters of related documents.

13. The system of claim 12, wherein the hashing comprises MinHash and the similarity scoring comprises Jaccard scoring.

14. The system of claim 11, wherein the key in the hash table represents a text fragment from a previously analyzed document.

15. The system of claim 11, wherein the match is a fuzzy match.

16. The system of claim 11, wherein the operations further comprise:
receiving a selection of a document for analysis by a user;
parsing the selected document into a plurality of fragments;
performing a lookup in the hash table for each of the plurality of fragments to determine whether each of the plurality of fragments has a match;
for matching fragments of the plurality of fragments, identifying a source document from the hash table that contributed a matching fragment; and
causing presentation of an identification of the source document relative to a corresponding matching fragment of the selected document.

17. The system of claim 16, wherein the causing the presentation further comprises causing presentation of a bar chart for the source documents, the bar chart illustrating a breakdown of sources that a domain of the source document gets its content from.

18. The system of claim 16, wherein the causing the presentation further comprises causing presentation of statistics of the source document, the statistics including one or more of a publication date of the source document, a number of fragments contributed to the selected document by the source document, and a number of other documents having the matching segment of the source document.

19. The system of claim 11, wherein the operations further comprise:
receiving a selection of a first document and a second document for comparison;
parsing the first document and the second document into a plurality of content fragments;
performing a Jaccard scoring process for the plurality of content fragments based on extracted words from the plurality of content fragments;
identifying content fragments having a Jaccard score that exceeds a predetermine Jaccard threshold; and
causing presentation of a graphical relationship between the matching fragments found in both the first document and the second document.

20. A non-transitory machine-readable storage medium storing instructions that, when executed by one or more processors of a machine, cause the one or more processors to perform operations comprising:
performing, by the machine, coarse clustering using DBSCAN to determine a plurality of documents to be analyzed that share common content features;
accessing a document of the plurality of documents to be analyzed;
extracting text fragments from the document including a first fragment and a second fragment;
determining whether each of the text fragments or derived hash keys from the text fragments matches an entry in a hash table created by the machine from analysis of previous documents;
based on a first fragment not matching any entries in the hash table, creating a new entry in the hash table and including an indication of the document that the new entry is from, the first fragment being used to generate a key for the new entry in the hash table; and
based on a second fragment matching an entry of the hash table, associating the document with a key of the matching entry in the hash table, the associating comprising updating the hash table by adding an identifier of the document to a list of one or more documents containing the second fragment.

\* \* \* \* \*